Dec. 15, 1964 S. SCHWARTZ 3,161,370
LIGHT SENSITIVE MATERIAL SPOOLING DEVICE
Filed June 7, 1960 2 Sheets-Sheet 1
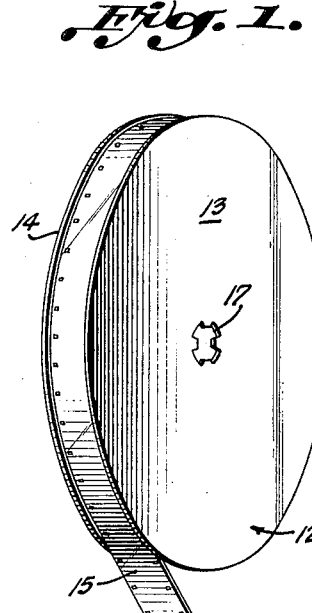
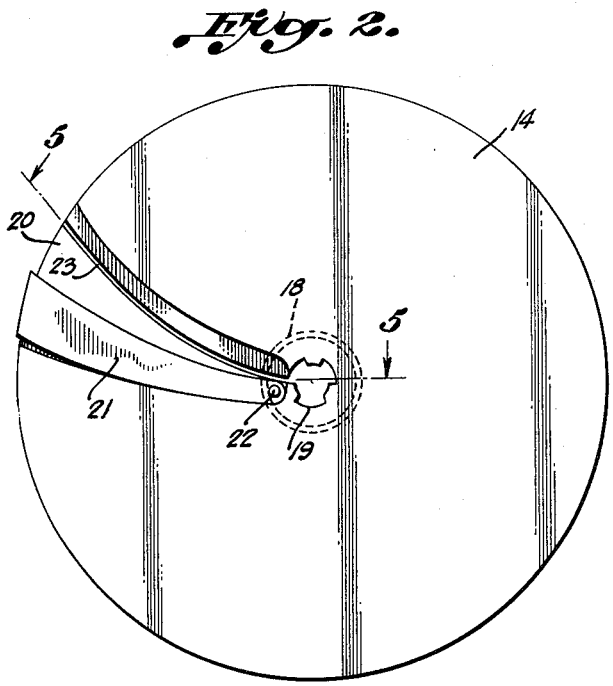
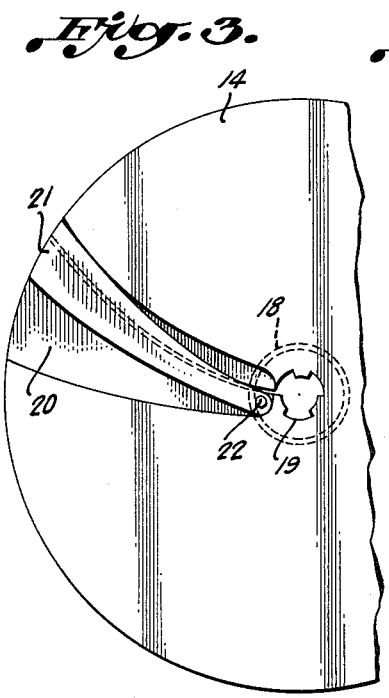
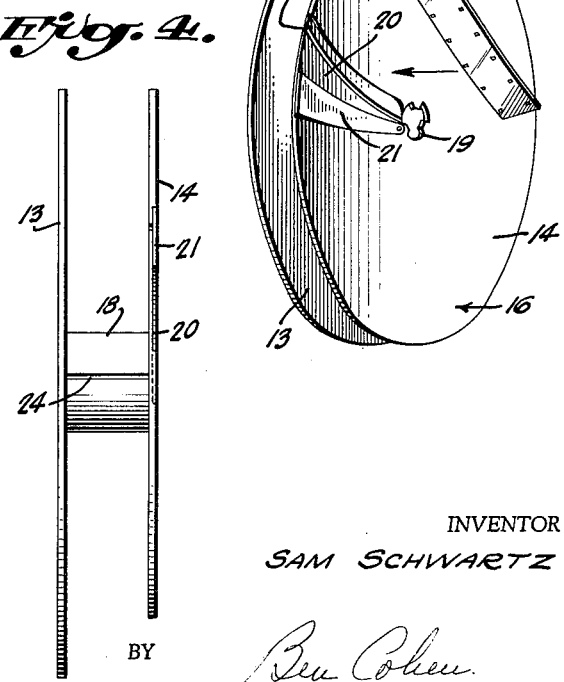
INVENTOR
SAM SCHWARTZ
BY
*Ben Cohen*
ATTORNEY Dec. 15, 1964     S. SCHWARTZ     3,161,370
LIGHT SENSITIVE MATERIAL SPOOLING DEVICE
Filed June 7, 1960     2 Sheets-Sheet 2
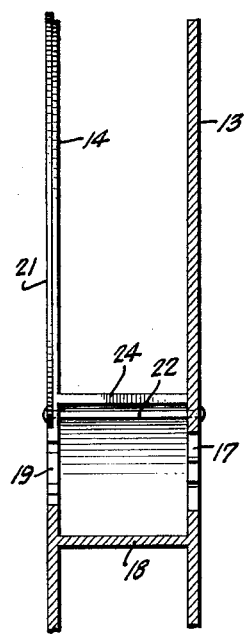
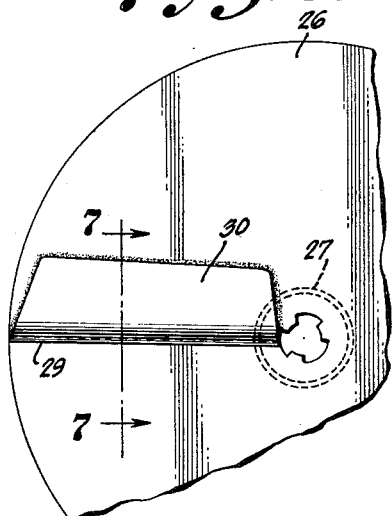
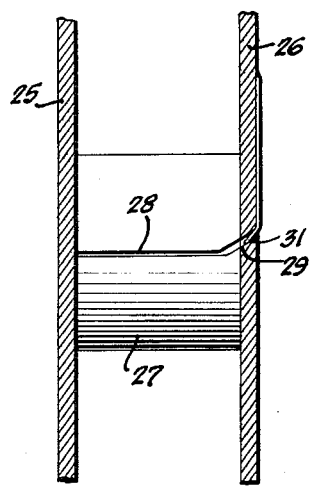
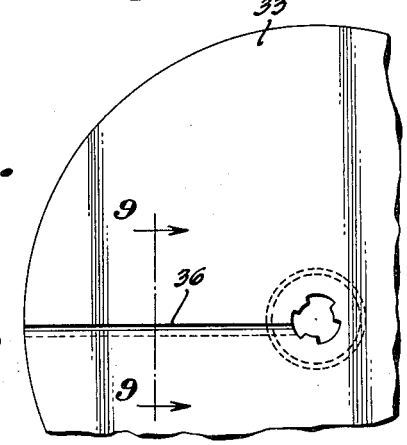
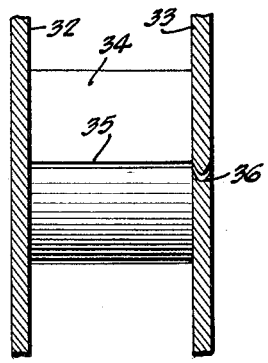
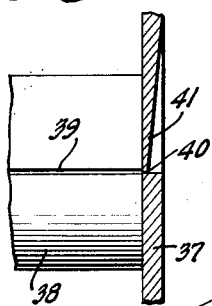
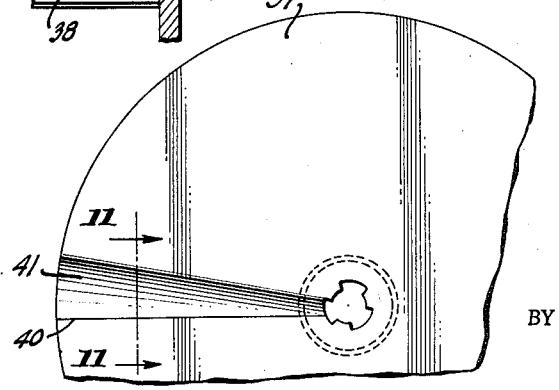
INVENTOR
SAM SCHWARTZ
BY
ATTORNEY United States Patent Office 3,161,370
Patented Dec. 15, 1964

3,161,370
LIGHT SENSITIVE MATERIAL SPOOLING
DEVICE
Sam Schwartz, 3550 Chesapeake St. NW.,
Washington, D.C.
Filed June 7, 1960, Ser. No. 34,478
2 Claims. (Cl. 242—74)

The present invention relates generally to spools or reels to hold or receive film, paper, plastic or other light sensitive material and more particularly relates to a novel spool or reel to permit ready loading of these spools as in motion picture cameras, still and copying cameras or other photographic apparatus.

By far the great majority of amateur motion pictures are made on 8 mm. films. This 8 mm. film is actually supplied on a reel which contains film of 16 mm. width and when exposed in a camera, only one-half of the film lengthwise receives the first exposure. The spools are reversed and turned over; the supply spool becoming the take up spool and vice versa, and the film is then run through the camera a second time to receive the exposure on the other half of the film. After processing, the 16 mm. film is split lengthwise and the two lengths are joined to form the finished roll of 8 mm. film. To eliminate the possibility of error in inserting the spools, top and bottom flanges are suitably keyed with dissimilar openings, usually four notches at the opening of the hub on one side and three notches on the other side. The spool loaded with unexposed film is placed in the camera on the idle supply spindle with the four-notched side turned up. An empty spool of similar design is placed on the lower drive spindle which has four appurtenances at its base matching the four notches of the flange of the spool. The empty take-up spool cannot be placed on the drive spindle unless it is turned over so that the three-notch side is face up. This requires the user to manipulate the spools twice and direct the unexposed film from the supply spool onto the take-up spool each time the film is run through the camera.

Heretofore the only way to load the empty take-up spool was by inserting the end of the film into a slot or opening provided in the hub of the spool which slot extended the full width of the core at right angles to and between the end flanges of the spool. Since the distance between the flanges of the spool is only slightly larger than the width of the 16 mm. film, it is quite difficult to insert the free end of the film into the slot provided in the core or hub of the reel. To facilitate the entrance of the film, the opening or slot is made many times wider than the thickness of the film, but this results in a very loose fitting which quite often results in the film becoming disengaged from the core of the reel and not feeding through properly, causing loss of the film. Also because of the position of the opening in the hub, the reel must be removed from the apparatus in order to insert the film which is time consuming and wasteful of film. The spool cannot be left in operating position in the apparatus when it is to be loaded in present day reels or spools.

Great care is necessary in inserting the film into existing spools. It must be placed deep into the opening and haste or inaccurate fitting becomes the cause of much trouble during operating since the loose unattached film will pile up at the supply spindle and become crinkled and crushed and spoiled and frequently cause damage to the apparatus. To insure proper anchorage of the film, a number of turns must be taken in the take-up reel which results in wastage of film.

The larger the diameter of the flanges for larger lengths of film, the more difficult it is to insert the free end of the film into the opening presently supplied on the larger spools. This is especially so since all spools are furnished with interior surfaces of a dark, dull finish, making it increasingly difficult to see the opening especially when used in areas with low illumination.

The present invention overcomes the aforementioned objections by providing a spool or reel in which a slot is formed on one of the flanges of the spool which slot extends from the outer edge of the flange and merges with the conventional slot or opening formed in the hub of the spool. Since it is of the utmost importance that no light is transmitted to the light sensitive material in the spool, means are provided to cover or close up the flange slot after the film is applied to the empty take-up reel.

Thus, a primary object of the present invention is to provide a novel and improved spool construction in which film or other light sensitive material may be inserted with greater ease without chance of error which would result in loss of film or damage to the apparatus.

A further object of the invention is to provide a spool which can be threaded before it is placed in the apparatus, or that can be threaded while it is in operating position within the apparatus.

A further object of the invention resides in an improved spool construction wherein the improvement can be added to existing spools.

Other objects and advantages of the present invention will become apparent from the following description when taken in connection with the accompanying drawings in which:

FIGURE 1 is a perspective view of a pair of film reels showing the manner of loading the empty or take-up reel;

FIGURE 2 is a front view of one form of the invention with the light closing means in open position;

FIGURE 3 is a similar view with the light closing means in closed position;

FIGURE 4 is an end view of the reel shown in FIGURE 2;

FIGURE 5 is a sectional view taken on the line 5—5 of FIGURE 2;

FIGURE 6 is a partial front view of a modified form of reel construction;

FIGURE 7 is a sectional view taken on the line 7—7 of FIGURE 6;

FIGURE 8 is a partial front view of a further modification of the present invention;

FIGURE 9 is a sectional view taken on the line 9—9 of FIGURE 8;

FIGURE 10 is a partial front view of a still further modified form of the invention; and FIGURE 11 is a sectional view taken on the line 11—11 of FIGURE 10.

For the purpose of illustrating the present invention, the invention is shown applied to conventional 8 mm. spools although it will be clear that the invention is applicable to spools of any size.

Referring to the drawings in detail and particularly to that form of the invention illustrated in FIGURES 1 to 5 inclusive, numeral 12 denotes a loaded film reel comprising spaced flanges 13 and 14. The film is indicated by the numeral 15. Film reel 16 is the same as reel 12 but shown in reverse position. As previously pointed out, one of the flanges such as 13 is provided with four notches 17 at the opening of the hub portion 18, whereas the opposite flange 14 is provided with three notches 19. FIGURE 1 indicates the relative positions of the reels when positioned in a camera which is not shown.

The flange member 14 has a sector shaped portion 20 provided by thinning the material of the flange to provide a reduced portion for receiving a pivoted gate member 21, pivoted to the flange adjacent the hub 18 by a pivot pin 22. The gate member 21 is of relatively thin material so that it does not project beyond the outer surface of the flange 14. A slot 23 is formed in said sector shaped portion and extends from the outer edge of the flange to the usual threading opening or slot 24 provided in the hub member 18.

As seen in FIGURE 1, the empty spool 16 is threaded by dropping the free end of the film through slot 23 with a portion of the film extending through a slot 24. During this operation, the gate 21 is held in open position. After the film is inserted in the above manner, the gate 21 is moved to the closed position as shown in FIGURE 3. A few turns of the reel 16 anchors the film in place and ready for use. This threading is accomplished while both reels are on their respective spindles in the camera. Although not shown, a spring may be provided for the gate for normally holding the gate in closed position. Thus, after the threading operation, the gate will automatically close. As shown in the present form, the gate is maintained closed by friction.

In the form of the invention shown in FIGURES 6 and 7, the reel is of usual construction having flanges 25, 26 with the hub portion 27 provided with the usual threading opening or slot 28. As illustrated in this form of the invention and which is also applicable to all of the forms shown and described, the slot 28 is of less width than the conventional slot found in existing spools or reels and need only be just large enough to receive the film being threaded. The flange 26 is provided with a slot 29 which is normally held closed by a very thin strip of flexible, resilient material 30 suitably secured to the outer face of the flange adjacent the slot 29 and having a portion 31 thereof slightly bent to extend into said slot to close the opening in said slot but being of sufficient resilience to permit entrance of film past said portion 31. While this form of the invention shows the flexible member 30 secured to the outer surface of the flange, it could be secured to the inner surface of the flange adjacent the slot with an edge thereof barely overlying the slot so that the edge may be displaced upon insertion of the film and which edge will return to closing position after the film is inserted.

In the modification disclosed in FIGURES 8 and 9, the reel is also of usual construction with flanges 32, 33 and hub member 34 having a threading slot 35. In this form of the invention, a separate closing member is not necessary because the slot 36 is formed on a curve transversely of the flange. The flange is suitably thickened to provide for this curve. Thus, since light must pass in a linear path, the curve prevents light from passing through the flange. Instead of a curve, the slot may be formed by a pair of angles extending from each side of the flange to a central point on the flange.

In the modification disclosed in FIGURES 10 and 11, the reel is also of conventional design but only one flange 37 is shown with the usual hub member 38 and threading slot 39. In this form of the invention, the entrance slot is indicated by the numeral 40 and the flange material adjacent the slot and at one side thereof indicated by numeral 41 is thinned down to make same substantially flexible whereby the thinned portion may be depressed prior to the insertion of the film to provide an enlarged opening for the reception of the film, and after same has been inserted, the pressure on the thinned portion released, said thinned portion will return to its normal position to close off the slot against egress of light.

It is apparent that the present constructions shown and described are well adapted to accomplish the various objects and advantages set forth. It will be also apparent that the other forms of the invention may be made without departing from the spirit of the invention. In forms shown, various minor mechanical changes may be made within the scope of the invention and although the reel has been shown as formed of metal, other materials could be also used. Therefore, I do not wish to be limited to any specific construction except as may be required by the appended claims.

Having thus described the invention, what is claimed is:

1. A reel for light sensitive material comprising spaced flanges connected by a central hub member, said hub member having a slot therein for receiving the free end of the light sensitive material, at least one of said flanges having a slot therein extending from an outer edge thereof to the slot formed in the hub member and merging therewith to permit threading of said reel through said flange slot, and resilient means secured to a face of said slotted flange and having a portion thereof covering said slot to prevent ingress of light to the interior of said reel.

2. A reel as defined in claim 1, said resilient means being secured to an outer face of the slotted flange and having a bent portion extending into the flange slot.

References Cited in the file of this patent
UNITED STATES PATENTS

| | | |
|---|---|---|
| 2,180,829 | Kolmodin | Nov. 21, 1939 |
| 2,606,686 | Barranco | Aug. 12, 1952 |
| 2,954,941 | Hultgren | Oct. 4, 1960 |